United States Patent [19]

Gage

[11] 3,728,038

[45] Apr. 17, 1973

[54] IMPROVED CHUCK KEY AND HOLDER

[76] Inventor: Arthur A. Gage, 2880 Sylvan Court, Oceanside, N.Y. 11572

[22] Filed: Feb. 12, 1971

[21] Appl. No.: 114,820

[52] U.S. Cl. ............................... 408/241, 81/90 A
[51] Int. Cl. .......................................... B23b 39/00
[58] Field of Search ..................... 81/90 A; 408/241

[56] References Cited

UNITED STATES PATENTS 3,174,365    3/1965    Lucarelli ............................ 408/241

*Primary Examiner*—Gil Weidenfeld
*Attorney*—Bauer & Amer

[57] ABSTRACT

A Jacobs chuck key holder mounted on the hand-drill housing for pivoting movement from an out-of-the-way clearance position into meshing engagement with the Jacobs chuck, either the chuck ring or drill operative end thereafter being rotated relative to the other to cause engagement or disengagement of the drill jaws with the drill bit, and the key lacking, as unnecessary, a centering projection so that no special alignment of the key with the drill operative end is required for the aforesaid meshing engagement.

10 Claims, 6 Drawing Figures

PATENTED APR 17 1973　　3,728,038

INVENTOR
ARTHUR A. GAGE

BY Bauer & Amer
ATTORNEYS

IMPROVED CHUCK KEY AND HOLDER

The present invention is generally related to a hand-drill, and more particularly to an improved key holder for the Jacobs chuck thereof.

It is well known that chuck keys are often misplaced, and accordingly it is an object of the present invention to minimize, if not entirely eliminate, such misplacement and also to achieve, in a greatly facilitated manner, the meshing engagement that must precede the tightening or loosening manipulation of the Jacobs chuck with the chuck key.

Among other distinguishing features, a chuck key demonstrating objects and advantages of the present invention lacks, as unnecessary, any centering projection, such as exists on a prior art key and in practice is projected into a cooperating hole in the drill operative end or sleeve. This facilitates meshing engagement between the key and chuck ring and also permits rotation of the drill operative end relative to the key. In selected embodiments, the key hereof is thus used to advantage to hold the chuck ring stationary while the drill operative end is rotated relative thereto with the result that the jaws are opened or closed upon the drill bit, depending on the direction of drill motor rotation.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein:

FIG. 1 is a side elevational view of said holder,

FIG. 2 is a front elevational view thereof illustrating further structural details thereof, and FIG. 3 is a top isolated view of the hinge plate for pivotally mounting the holder.

Figure 2:
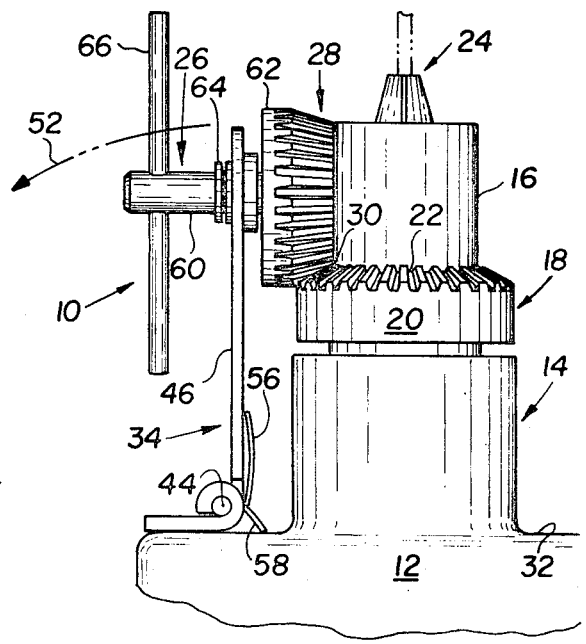
Figure 4:
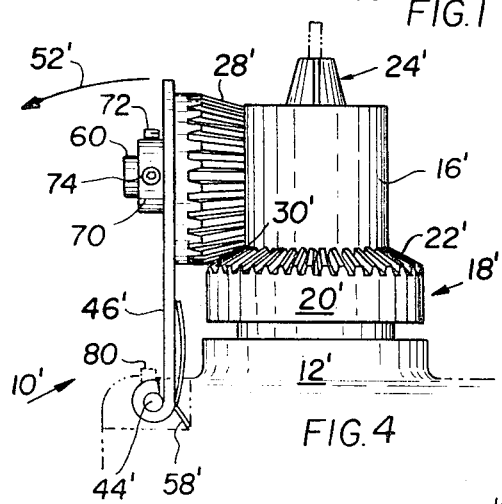
FIGS. 4 and 5 illustrate a second embodiment of the invention hereof, namely to wit.

FIG. 4, like FIG. 2, is a front elevational view of a chuck key holder, and

Figure 5:
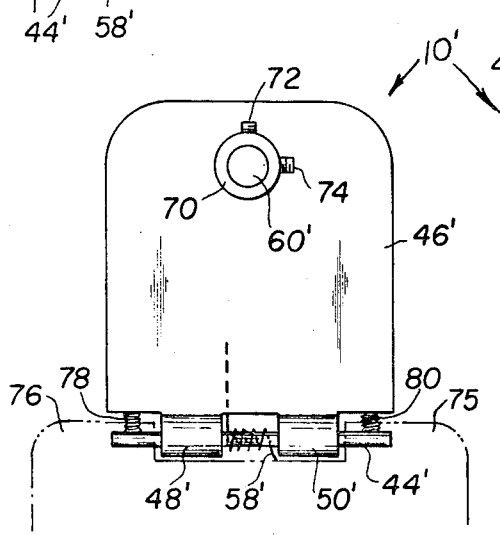

FIG. 5 is a side elevational view thereof illustrating further structural details.

Figure 6:
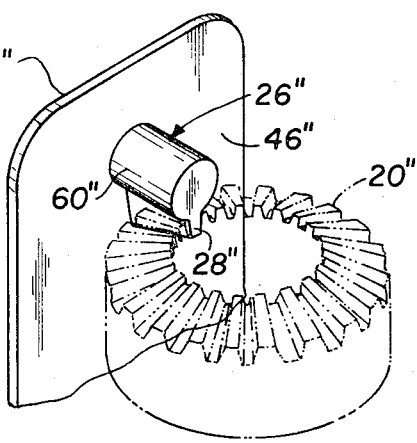

FIG. 6 is a perspective view of still another embodiment of a chuck key holder according to the present invention.

Figure 1:
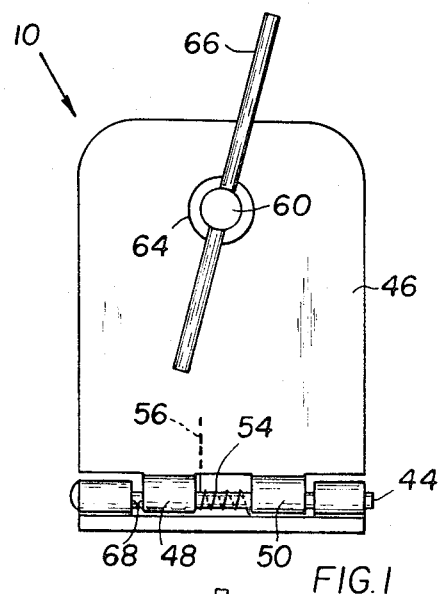
FIGS. 1-3 illustrate a first embodiment of the invention, namely to wit.
Figure 3:
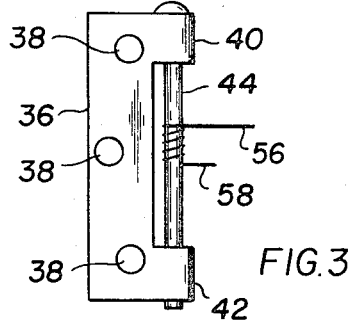

Reference is now made to FIGS. 1-3 illustrating a first embodiment of an improved chuck key holder, generally designated 10, demonstrating objects and advantages of the present invention. Said embodiment, as well as the other embodiments subsequently to be described, are intended for use with a standard, conventional hand-drill 12 of the type having an internal motor within an external housing 14 which defines a rotational axis extending longitudinally of the drill 12. Adjacent the drill operative end 16 is a standard Jacobs chuck 18, including a rotating ring 20 presenting a first set of bevel teeth 22 by which the chuck is engaged and, depending upon its direction of rotational movement about the rotational axis, is effective in either tightening or loosening the gripping engagement 24 of the operative end of the motor shaft with the drill bit.

As is generally understood, a key, herein designated 26, having at one end a complimentary set of bevel teeth 28, is adapted to be placed in meshing engagement, as at 30, with the chuck bevel teeth 22 preparatory to powering the ring 20 in the appropriate direction of rotation to either engage or disengage the drill bit. It is well known that chuck keys are often misplaced, and accordingly it is an object of the present invention to prevent such misplacement and also to achieve, in a greatly facilitated manner, the meshing engagement 30 between the bevel teeth 28 and 22.

As clearly illustrated in the construction of the first embodiment 10 hereof, advantageous use is made of the increased dimension of the housing 12 in that the same provides a peripheral shoulder 32 serving as a mounting surface for a holder, generally designated 34, which engages the key 26 and presents it for meshing engagement with the Jacobs chuck 18. Holder 34 includes a hinge plate 36 appropriately secured, as by screws or the like at 38, to the mounting surface 32. In a well understood manner, curved structures 40 and 42 retain a pivot pin 44 on which a holder plate or member 46 is pivotally mounted. Specifically, member 46 includes, as best illustrated in FIG. 1, depending structures 48 and 50 which accommodate the pin 44 therethrough and thereby enable pivotal movement 52 in the member 46. The medial portion of a helical spring 54 is disposed along the pin 44, and the opposite spring ends 56 and 58 respectively abut the member 46 and mounting surface 32 so that the member 46 is normally biased through that direction of pivotal movement 52 which moves the key 26 to a clearance position out of meshing engagement with the Jacobs chuck 18.

When it is desired to achieve meshing engagement 30, however, it is necessary merely to pivot the member 46 into its operative position illustrated in FIG. 2. Contributing to readily achieving meshing engagement 30 is the location of the key 26 at a distance from the pivot axis or pin 44 which corresponds to the distance that the bevel teeth 22 are located from the mounting surface 32, making due allowance for the fact that the key bevel teeth 28 are presented at one end of a rotatably mounted shaft 60. Thus, shaft 60 is spaced from the pivot pin 44 a distance corresponding to the distance of the bevel teeth 22 from the mounting surface 32 and the radius of the ring 62 in which the key bevel teeth 28 are machined.

From the foregoing, it should be readily appreciated that by the proper selection of the location at which key 26 is engaged in the member 46, meshing engagement 30 will result whenever member 46 is pivoted into its FIG. 2 position. Moreover, to preserve this relationship, the key 26 is restricted only to rotative movement and, to this end, is mounted in a well understood manner for rotative movement within a sleeve bearing 64 or the like. Completing the key 26 is a hand grip 66 which facilitates rotation of the shaft 60. It is significant to note that, consistent with the facilitated manner in which meshing engagement 30 is achieved between the sets of bevel teeth 28 and 22 according to the present invention, the power end 16 of the hand drill 12 is devoid of any apertures or openings therein, as are found in the prior art and which serve as a support, holding or centering structure for the front end of the key shaft 60. Additionally, provision is made for a slight amount of play, to the extent of the space 68, for movement of the member 46 longitudinally along the pivot pin 44 in order to obtain an interfitting of the teeth 28 and 22 with each other without having to rotate rotating ring 20.

Following the establishment of meshing engagement 30 between the teeth 28 and 22, rotation of the key 26 causes rotation of the ring 20 relative to the drill operative end or sleeve 16, and thus closing movement 24 of the jaws about the drill bit. Inertia of the drill rotor will normally hold the drill end 16 stationary while ring 16 is rotated, or this relative movement may be achieved manually by the user actually holding the end 16 stationary. The securement of the key 26 to the member 46 which, in turn, is mounted to the housing 12 is, of course, effective in preventing the key 26 from merely walking around the bevel teeth 22 of ring 20 rather than causing rotation of the ring 20.

In the second embodiment of an improved chuck key holder according to the present invention, which is illustrated more particularly in FIGS. 4 and 5, a great deal of the structure is similar to that already described and, for brevity's sake, will not again be referred to. This duplicate structure is designated by the same, but primed, reference numerals. The significant structural difference is that the key shaft 60', which is carried in the free end of the member 46', is held against rotation. This is preferably achieved by disposing a collar 70 about the shaft 60' on the side remote from the bevel teeth 28'. As is perhaps best illustrated in FIG. 5, set screws 72 and 74 are threadably disposed in the collar 70 and will be understood to engage the shaft 60' to hold it against rotation.

Assuming, therefore, that the stationary key 28' is in meshing engagement 30' with the teeth 22' of the Jacobs chuck 18', it should be readily appreciated that the rotation of the motor shaft during operation of the drill 12' will result in either tightening or loosening of the engagement 24' with the tool bit, depending upon the direction of rotation of the motor. This embodiment of the invention is preferrably used with a variable speed drill having an automatic cut-off to prevent burning out of the motor in the event that it is permitted to operate after the ring 20' has been rotated into either its fully closed or its fully opened position.

Also in this embodiment, the hinge pin 44' is disposed in spaced housing hubs 75, 76 and held in place by set screws 78, 80.

A third embodiment of the invention is illustrated in FIG. 6, this embodiment being very similar to the second embodiment of FIGS. 4 and 5 in that during use it is the rotation of the drill motor which causes either tightening or loosening of the Jacobs chuck. Specifically, as illustrated in FIG. 6, the plate or holder member 46'' has a laterally extending key structure 26'', which is formed as an integral part of the member 46''. The distinctive feature of the key 26'' is that it embodies only a single tooth 28'' which, as illustrated, occupies a depending position from its shaft 60''. This simplified construction is directly attributable to the elimination of any need for rotative movement in the Jacobs chuck key, and also of the ability, in accordance with the present invention, of achieving meshing engagement of the teeth 28'' and 20'' without the need to rotate a centering hole of the drill power end into position to receive a projection or the like from the front of the key.

An even more important and significant advantage of the improved key hereof which has no centering projection on its front, particularly in the case of the stationary embodiments 26' and 26'', is that this omission freely permits rotation of the drill power end, and exemplified by end 16', relative to said stationary keys 28' and 26''. As already noted, it is this rotation of the motor which provides either tightening or loosening engagement of the drill jaws 24' about the drill bit.

From the foregoing, it should be readily appreciated that there has been described herein improved embodiments of a chuck key and a cooperating holder which each obviates any misplacement or loss of the key, and in connection with which there is facilitated meshing engagement of the key with a conventional, standard Jacobs chuck. Tightening or loosening of the chuck is achieved as a result of relative movement between the chuck and the motor power shaft, this relative movement being the result of rotating the chuck with the key relative to the power shaft or holding the chuck stationary with a stationary key while operating the drill motor which, of course, powers the motor shaft in rotation relative to the stationary chuck.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. For use with a hand-drill motor having a housing thereabout defining a rotation axis, said housing including a mounting surface oriented perpendicular to said rotation axis and having a Jacobs chuck presenting a first set of bevel teeth rotatable about said rotation axis and located a prescribed distance from said mounting surface, an improved combination of a holder and a Jacobs chuck key presenting a second set of bevel teeth for tightening and loosening said Jacobs chuck incident to meshing engagement of said first and second sets of bevel teeth, said second set of bevel teeth being the only means on said Jacobs chuck key in meshing engagement between said Jacobs chuck key and said chuck so as to require only said meshing engagement therewith to cause rotation of said Jacobs chuck, and said holder comprising a member pivotally mounted on said mounting surface and at a selected location therealong in engagement with the shaft of said Jacobs chuck key, said selected location corresponding to the aforesaid prescribed distance of the Jacobs chuck bevel teeth from said mounting surface so as to contribute to said meshing engagement therewith by said Jacobs chuck key bevel teeth, and said holder including means to align said Jacobs chuck key to mesh for engagement with said teeth of said Jacobs chuck.

2. An improved combination of a holder and a Jacobs chuck key as defined in claim 1 including threadable means operatively arranged to prevent rotation of the shaft of said Jacobs chuck key, whereby rotational movement of the motor of said hand-drill causes tightening and loosening manipulation of said Jacobs chuck.

3. An improved combination of a holder and a Jacobs chuck key as defined in claim 1 wherein said pivotal mounting of said member is operatively arranged to permit slight movement of said member along said pivot axis to thereby facilitate the interfitting of said first and second sets of bevel teeth.

4. An improved combination of a holder and a Jacobs chuck key as defined in claim 3 including spring means opera-tively effective to normally bias said member into a clearance position out of meshing engagement with said Jacobs chuck.

5. An improved combination of a holder and Jacobs chuck key as defined in claim 2 wherein said set of bevel teeth of said Jacobs key consists of a minimum of one such tooth in depending relation from said shaft of said key.

6. For use with a hand-drill motor having a housing and a rotating operative end extending therefrom defining a rotation axis, said housing including a mounting surface oriented perpendicular to said rotation axis and having a Jacobs chuck presenting a first set of bevel teeth rotatable about said rotation axis located a prescribed distance from said mounting surface, an improved Jacobs chuck key presenting a second set of bevel teeth for tightening and loosening said Jacobs chuck incident to meshing engagement of said first and second sets of bevel teeth, said second set of bevel teeth being the only means on said Jacobs chuck key in meshing engagement between said Jacobs chuck key and said chuck so as to require only said meshing engagement therewith to cause rotation of said Jacobs chuck and also permitting unimpeded rotation of said drill operative end relative to said key, a holder for said key stationarily mounted on said housing and holding said key against rotation, whereby operation of said hand-drill motor is effective to cause tightening and loosening manipulation of said Jacobs chuck.

7. An improved Jacobs chuck key as defined in claim 6 wherein said holder comprises a member pivotally mounted on said mounting surface at a selected location therealong corresponding to said prescribed distance of the Jacobs chuck bevel teeth from said mounting surface so as to contribute to said meshing engagement therewith by said Jacobs chuck key bevel teeth.

8. An improved combination of a holder and a Jacobs chuck key as defined in claim 7 wherein said pivotal mounting of said member is operatively arranged to permit slight movement of said member along said pivot axis to thereby facilitate the interfitting of said first and second sets of bevel teeth.

9. An improved combination of a holder and a Jacobs chuck key as defined in claim 8 including spring means operatively effective to normally bias said member into a clearance position out of meshing engagement with said Jacobs chuck.

10. An improved combination of a holder and Jacobs chuck key as defined in claim 9 wherein said set of bevel teeth of said Jacobs chuck key consists of a minimum of one such tooth in depending relation from said key.

* * * * *